(12) United States Patent
Nagasawa

(10) Patent No.: US 6,788,695 B1
(45) Date of Patent: Sep. 7, 2004

(54) SYSTEM AND METHOD CAPABLE OF CARRYING OUT HIGH-SPEED IP ROUTING BY THE USE OF A BINARY TREE COMPRISING A REDUCED NUMBER OF NODES

(75) Inventor: Shinya Nagasawa, Tokyo (JP)

(73) Assignee: NEC Corporation, Tokyo (JP)

( * ) Notice: Subject to any disclaimer, the term of this patent is extended or adjusted under 35 U.S.C. 154(b) by 819 days.

(21) Appl. No.: 09/644,042

(22) Filed: Aug. 23, 2000

(30) Foreign Application Priority Data

Aug. 23, 1999 (JP) .......................................... 11/236217

(51) Int. Cl.$^7$ .......................... H04L 12/28; H04L 12/56
(52) U.S. Cl. ...................... 370/408; 370/351; 370/389; 370/392
(58) Field of Search ................................ 370/389, 392, 370/256, 351, 390, 391, 395, 396, 398, 422, 400, 408, 352, 353, 354, 355, 356; 707/8; 709/247, 202

(56) References Cited

U.S. PATENT DOCUMENTS 6,018,524 A * 1/2000 Turner et al. ............... 370/392
6,052,683 A * 4/2000 Irwin ............................. 707/8
6,061,712 A * 5/2000 Tzeng ......................... 709/202
6,067,574 A * 5/2000 Tzeng ......................... 709/247
6,192,051 B1 * 2/2001 Lipman et al. ............. 370/389
6,307,855 B1 * 10/2001 Hariguchi ................... 370/392

FOREIGN PATENT DOCUMENTS

JP A 11-191781 7/1999

* cited by examiner

*Primary Examiner*—Yvonne Quy Ha
(74) *Attorney, Agent, or Firm*—Young & Thompson

(57) ABSTRACT

A high-speed IP routing system (1) for searching a best route for an object IP address by the use of a binary tree comprises a volatile memory (15) storing the binary tree exclusively comprising a plurality of route nodes each of which has route information, a next node selection circuit (2) for successively selecting, with respect to the object IP address, every next nodes as selected nodes starting from a root node of the binary tree stored in the volatile memory (15), and an adopted route determining circuit (4) for comparing the route information of each of the selected nodes selected by the next node selection circuit (2) and the object IP address to determine an adopted route IP address to be adopted as a next route.

5 Claims, 5 Drawing Sheets

SYSTEM AND METHOD CAPABLE OF CARRYING OUT HIGH-SPEED IP ROUTING BY THE USE OF A BINARY TREE COMPRISING A REDUCED NUMBER OF NODES

BACKGROUND OF THE INVENTION

This invention relates to an IP (Internet Protocol) routing system and, in particular, to a high-speed IP routing system utilizing a binary tree comprising a plurality of nodes. This invention also relates to an IP routing method executed by the above-mentioned system.

When an IP packet is transferred, an IP routing (or IP route look-up) operation is traditionally carried out on a software basis.

Referring to FIG. 1, description will be made of a binary tree for use in a conventional software-based IP routing technique.

When the binary tree is created from a routing table, a destination network address in each route entry is recognized simply as a bit sequence. For example, the binary tree illustrated in FIG. 1 is used in FreeBSD to search a route corresponding to CIDR (Classless Inter-Domain Routing).

Every node (hereinafter may be referred to as a parent node) forming the binary tree is branched to at most two nodes (hereinafter may be referred to as child nodes).

The nodes contained in the binary tree are classified into route nodes having route information and repeater nodes having no route information and used exclusively for branching.

The number of the repeater nodes never exceeds the number of the route nodes. Therefore, the total number of the nodes required to form the binary tree is up to about twice the number of route entries.

In case where a plurality of matches are found, a route node with a shorter mask is located at a branch point between a root node and a leaf node while all other route nodes are leaf nodes.

Each node is assigned with a check bit number. The check bit number represents a bit position of a check bit for judgment about which one of the child nodes is to be selected as a branch for each node.

In a search algorithm (Forward Search) used in the software-based IP routing technique, selection of a child node is repeated until a lowermost node is reached as a reached node. Then, comparison is carried out between an object IP address to be subjected to routing and an IP address of the reached node. Upon coincidence, i.e., if a match is found, route information possessed by the reached node is adopted. Upon incoincidence, i.e., if a match is not found, routing or route look-up proceeds to another node linked upward from the reached node to perform a similar operation.

In the example illustrated in FIG. 1, the object IP address is "85.05.17.11". In this event, the routing starts from a root node A, proceeds through nodes B, C, D, and E, and reaches a leaf node F at the bottom. Because of incoincidence between the object IP address and the IP address of the leaf node F, the routing proceeds to the node E. Eventually, the route information possessed by the node E is adopted.

Following the recent spread of the internetworking, an IP packet transfer apparatus equipped in a backbone network is required to have an ability of carrying out a routing operation at an extremely high speed on a high-speed interface such as OC (Optical Carrier level)12/OC48.

Under the circumstances, the above-mentioned software-based IP routing technique using the Forward Search algorithm is disadvantageous in that high-speed routing is inhibited by useless transfer between the nodes (in the illustrated example, from the node E to the node F and then from the node F to the node E).

The binary tree looked up in the above-mentioned software-based IP routing technique includes the repeater nodes having no route information. Possibly, one repeater node is added every time when one route entry is added.

Therefore, the number of nodes contained in the binary tree is increased so that the operation becomes complicated and time-consuming.

SUMMARY OF THE INVENTION

It is therefore an object of this invention to provide a high-speed IP routing system and a high-speed IP routing method capable of reducing the number of nodes included in a binary tree and carrying out a routing operation at a high speed.

According to this invention, a high-speed IP routing system for searching a best route for an object IP address by the use of a binary tree comprises a volatile memory storing the binary tree exclusively comprising a plurality of route nodes each of which has route information, a next node selection circuit for successively selecting, with respect to the object IP address, every next nodes as selected nodes starting from a root node of the binary tree stored in the volatile memory, and an adopted route determining circuit for comparing the route information of each of the selected nodes selected by the next node selection circuit and the object IP address to determine an adopted route IP address to be adopted as a next route.

In the above-mentioned system, the binary tree does not include any repeater node having no route information, unlike the binary tree used in the conventional software-based IP routing technique. Therefore, the number of nodes can be reduced to a half at minimum. It is therefore possible to increase the number of route entries or to implement the system by the use of a small-capacity RAM.

Preferably, each node in the binary tree stored in the volatile memory has, as the route information, identification of a node type, an IP address of the node, a mask length, and an adopted route IP address. The node type is either a comparison branch node or a bit branch node. Each of the comparison branch node and the bit branch node satisfies a condition that a parent node has a mask length not longer than that of a child node. The comparison branch node satisfies a condition that a bit sequence of the parent node is coincident with a masked bit sequence obtained by masking a bit sequence of one of left and right child nodes with a mask of the parent node. The bit branch node satisfies a condition that a bit sequence of the parent node is coincident with a masked bit sequence obtained by masking a bit sequence of one of left and right child nodes with the mask of the parent node and that a k-th bit from a most significant bit as a first bit has "0" and "1" in one and the other of the left and the right child nodes, respectively, where k is equal to the mask length plus one.

In the above-mentioned system, each node of the binary tree is classified into the comparison branch node and the bit branch node so that the number of nodes can be reduced up to a half.

Preferably, if the selected node selected by the next node selection circuit is the comparison branch node, comparison is made between a masked result obtained by masking the object IP address with a mask of the mask length of the selected node and the IP address of the selected node to judge coincidence or incoincidence. The selected node is branched to one and the other of the left and the right child nodes upon coincidence and upon incoincidence, respectively, to continue searching or routing. If the selected node selected by the next node selection circuit is the bit branch node, comparison is made between a masked result obtained by masking the object IP address with a mask of the mask length of the selected node and the IP address of the selected node. Upon coincidence, the selected node is branched to one and the other of the left and the right child nodes when a k-th bit has "0" and "1", respectively, where k is equal to the mask length plus one.

With the above-mentioned system, a search algorithm is improved, taking into account the use of simultaneous processing of next node selection and address comparison, to eliminate useless transfer between the nodes caused by the Forward Search used in the conventional software-based routing technique.

Preferably, the above-mentioned adopted route determining circuit produces, if coincidence is detected in the above-mentioned comparison, the adopted route IP address of the selected node as a next route. If the comparison branch node or the bit branch node does not have the left or the right child node to be a branch node upon selection by the next node selection circuit or if incoincidence is detected in the comparison for the bit branch node, searching or routing comes to an end.

With the above-mentioned system, an IP packet is transferred to the next route.

According to this invention, there is also provided a high-speed IP routing method of searching a best route for an object IP address by the use of a binary tree comprises the steps of making a volatile memory store the binary tree exclusively comprising a plurality of route nodes each of which has route information, successively selecting, with respect to the object IP address, every next nodes as selected nodes starting from a root node of the binary tree stored in the volatile memory, and comparing the route information of each of the selected nodes selected in the selecting step and the object IP address to determine an adopted route IP address to be adopted as a next route.

In the above-mentioned method, the binary tree does not include any repeater node having no route information, unlike the binary tree used in the conventional software-based IP routing technique. Therefore, the number of nodes can be reduced to a half at minimum. It is therefore possible to increase the number of route entries or to implement the system by the use of a small-capacity RAM.

DESCRIPTION OF THE PREFERRED EMBODIMENT

Figure 1:
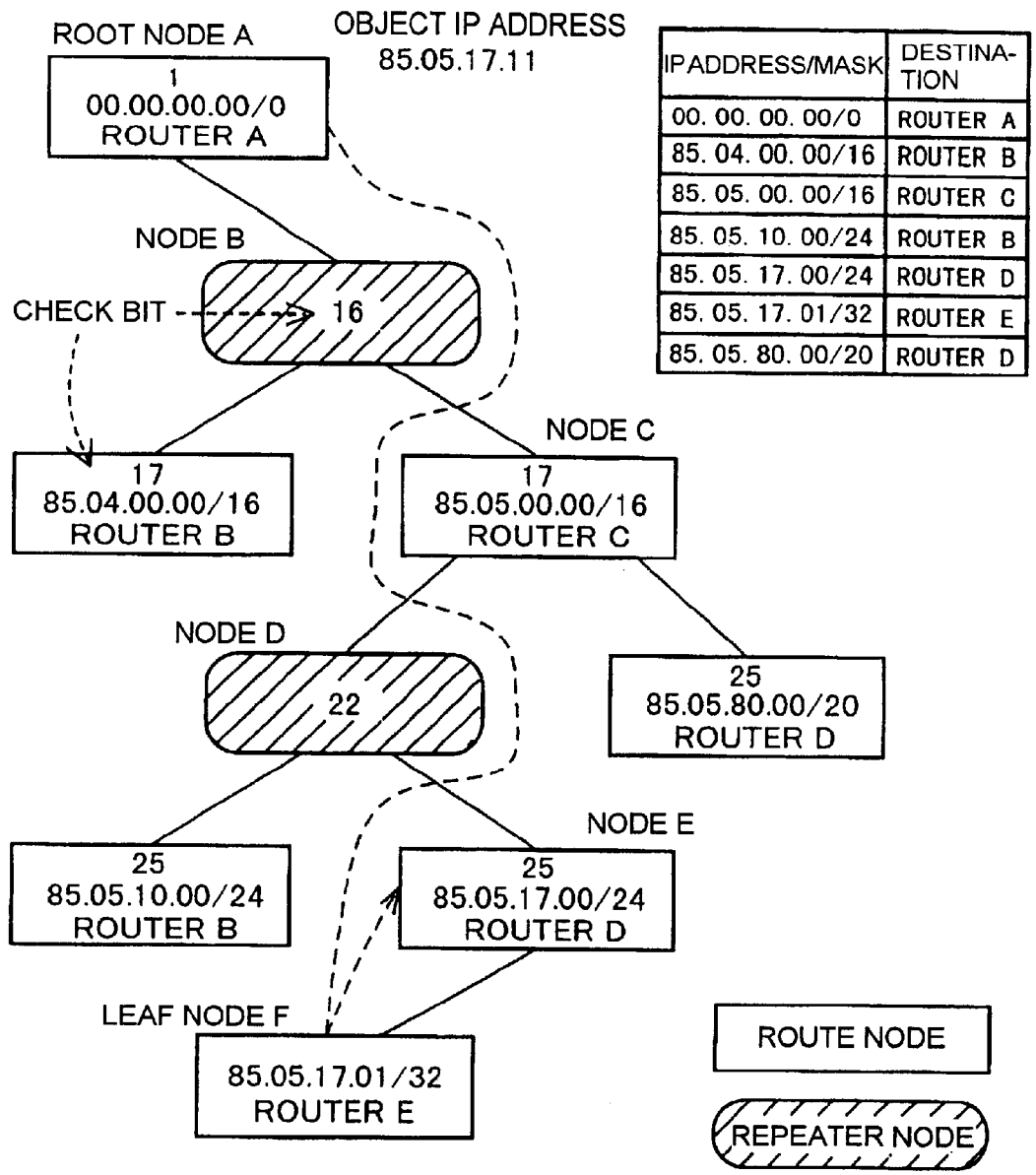
FIG. 1 is a view for describing the structure of a binary tree used in a conventional software-based IP routing technique.

Now, description will be made of an embodiment of this invention with reference to the drawing.

In this invention, a binary tree used in a routing operation comprises a plurality of nodes which are classified into two types, i.e., a bit branch node and a comparison branch node. The comparison branch node is a node to branch to a next node with reference to a result of comparison between IP addresses while the bit branch node is a node to branch to a next node with reference to a value of a particular bit, as will later be described.

By changing a selection method in dependence upon the node type, i.e., by simultaneously processing next node selection and IP address comparison in the routing operation, the routing operation can be carried out at a high speed.

Specifically, by providing the binary tree with two types of nodes, i.e., the bit branch nodes and the comparison branch nodes, the number of nodes is reduced to a half at minimum as compared with the binary tree used in the conventional software-based IP routing technique.

Figure 2:
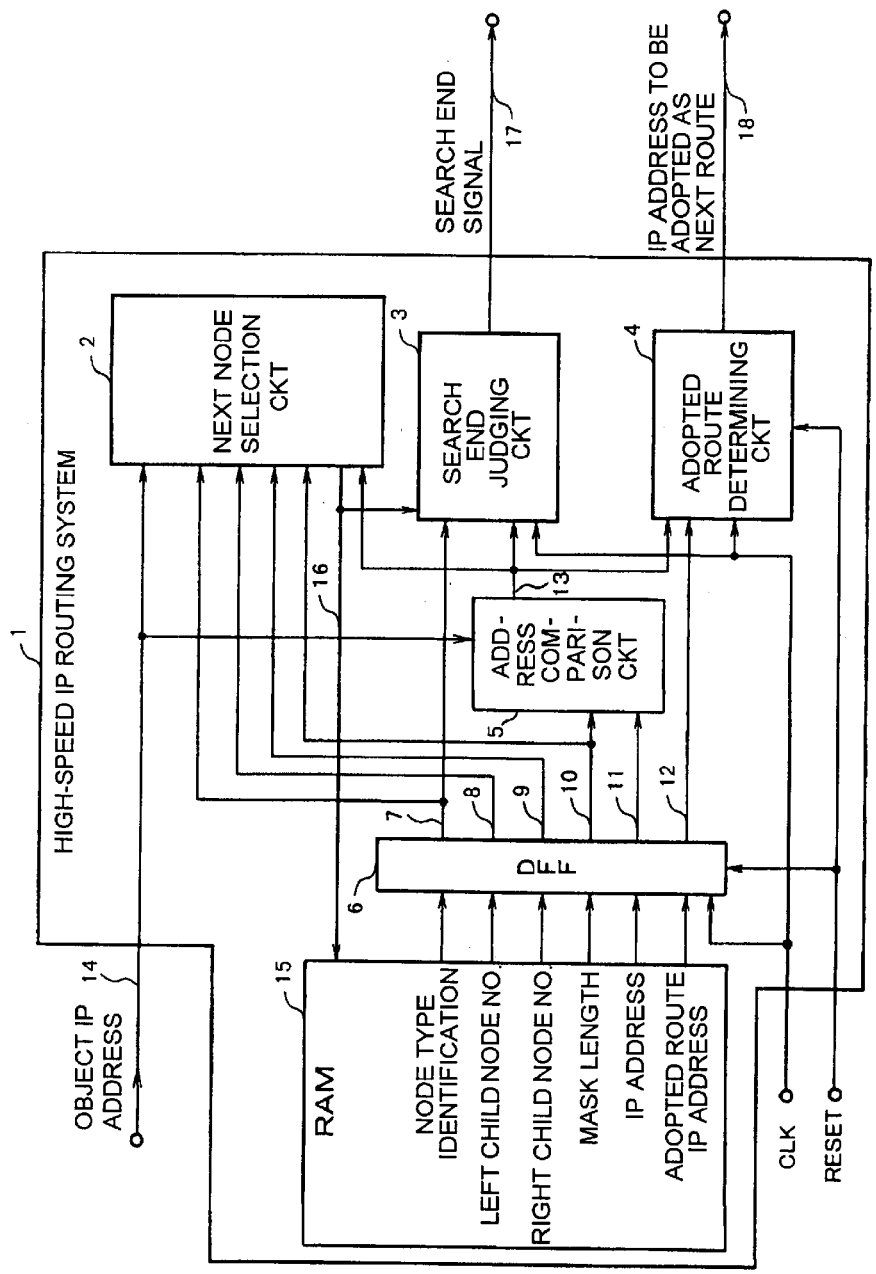
FIG. 2 is a block diagram of a high-speed IP routing system according to this invention.

At first referring to FIG. 2, a high-speed IP routing system 1 according to this invention comprises a next node selection circuit 2, a search end judging circuit 3, an adopted route determining circuit 4, an address comparison circuit 5, and a DFF (Delay Flip Flop) 6. The DFF 6 is connected to a RAM (Random Access Memory) 15 which is a volatile memory. The RAM 15 memorizes a binary tree used in searching an IP route.

Specifically, the RAM 15 memorizes, for each node of the binary tree, node type identification (bit branch node or comparison branch node), a left child node number, a right child node number, a mask length, an IP address, and an adopted route IP address.

The bit branch node is a node to branch to the left and the right when a bit selected from an object IP address subjected to routing by the binary tree has a value "0" and a value "1", respectively. Alternatively, the reverse may apply.

The comparison branch node is a node to branch to the left and the right when coincidence and incoincidence are detected in IP address comparison with respect to the object IP address. Alternatively, the reverse may apply.

More specifically, the bit branch node satisfies the following conditions, assuming that a parent node in the binary tree is the bit branch node.

(1) A bit sequence of a parent node IP address is equal to a masked bit sequence obtained by masking a child node IP address with the parent node mask.

(2) The mask length of the parent node is not longer than the mask length of the child node.

(3) A k-th bit counted from a most significant bit as a first bit has "0" and "1" in the left and the right child nodes, respectively, where k is equal to the mask length plus one. Alternatively, the reverse may also apply.

On the other hand, the comparison branch node satisfies the following conditions assuming that a parent node in the binary tree is the comparison branch node.

(4) A bit sequence of a parent node IP address is equal to a masked bit sequence obtained by masking a left child node IP address with the parent node mask and is different from a masked bit sequence obtained by masking a right child node IP address with the parent node mask. Alternatively, the reverse may also apply.

(5) The mask length of the parent node is not longer than the mask length of the child node.

If the binary tree is created to satisfy the above-mentioned conditions, the number of nodes can be reduced as compared with the binary tree used in the conventional software-based IP routing technique.

As a result, it is possible to increase route entries of the binary tree or to reduce the capacity of the RAM 15.

The DFF 6 connected to the RAM 15 is supplied from the RAM 15 with the node type identification, the left child node number, the right child node number, the mask length, the IP address, and the adopted route IP address. After holding these data, the DFF 6 delivers the node type identification, the left child node number, the right child node number, the mask length, the IP address, and the adopted route IP address to output lines 7, 8, 9, 10, 11, and 12, respectively.

Herein, the left child node number and the right child node number are represented by addresses in the RAM 15 where the left child node information and the right child node information are stored, respectively.

The output lines 7, 8, 9, and 10 of the DFF 6 are connected to the next node selection circuit 2. In addition, the next node selection circuit 2 is supplied from an input line 14 with the object IP address and from an output line 13 of the address comparison circuit 5 with a coincidence signal or an incoincidence signal as a comparison result. The next node selection circuit selects a next node and produces a next node selection signal which is sent through an output line 16 to the RAM 15. The information of the next node is extracted from the RAM 15 and held in the DFF 6.

The next node selection circuit 2 selects the next node in the following manner. It is assumed that the DFF 6 delivers on the output line 7 the node type identification representative of the bit branch node. In this event, if a k-th bit (k being equal to the mask length plus one) counted from a most significant bit of the object IP address supplied from the input line 14 has "0", the next node selection circuit 2 selects, as the next node, the left child node number on the output line 8. On the contrary, if the k-th bit has "1", the next node selection circuit 2 selects, as the next node, the right child node number on the output line 9. In either event, the next node selection circuit 2 produces the next node selection signal representative of the next node and sends the next node selection signal through the output line 16 to the RAM 15 as described above.

On the other hand, it is assumed that the DFF 6 delivers on the output line 7 the node type identification representative of the comparison branch node. In this event, if the address comparison circuit 5 produces the coincidence signal, the next node selection circuit 2 selects, as the selected node, the left node number on the output line 8. On the contrary, if the address comparison circuit 5 produces the incoincidence signal, the next node selection circuit 2 selects, as the selected node, the right child node number on the output line 9. In either event, the next node selection circuit 2 produces the next node selection signal representative of the next node and sends the next node selection signal through the output line 16 to the RAM 15 as described above.

In absence of the left child node number or the right child node number to be delivered to the output line 16, the next node selection signal 2 produces a NULL signal which is delivered to the output line 16.

The output line 13 of the address comparison circuit 5 and the output line 12 of the DFF 6 are connected to the adopted route determining circuit 4. If the coincidence signal is supplied from the output line 13 of the address comparison circuit 5, the adopted route determining circuit 4 holds the adopted route IP address as a next route and delivers the adopted route IP address to an output line 18.

The output line 13 of the address comparison circuit 5, the output line 6 of the DFF 6, and the output line 16 of the next node selection circuit 2 are connected to the search end judging circuit 3. If the output line 7 of the DFF 6 carries the node type identification representative of the bit branch node and the output line 13 of the address comparison circuit 5 indicates "incoincidence" or if the output line 7 of the DFF 6 carries the node type identification representative of the comparison branch node and the output line 16 of the next node selection circuit 2 is given the NULL signal, the search end judging circuit 3 produces a search end signal on an output line 17.

In each of the DFF 6, the search end judging circuit 3, the adopted route determining circuit 4, input, hold, and output operations are carried out by the use of a clock (CLK) signal and a reset (RESET) signal.

Figure 3:
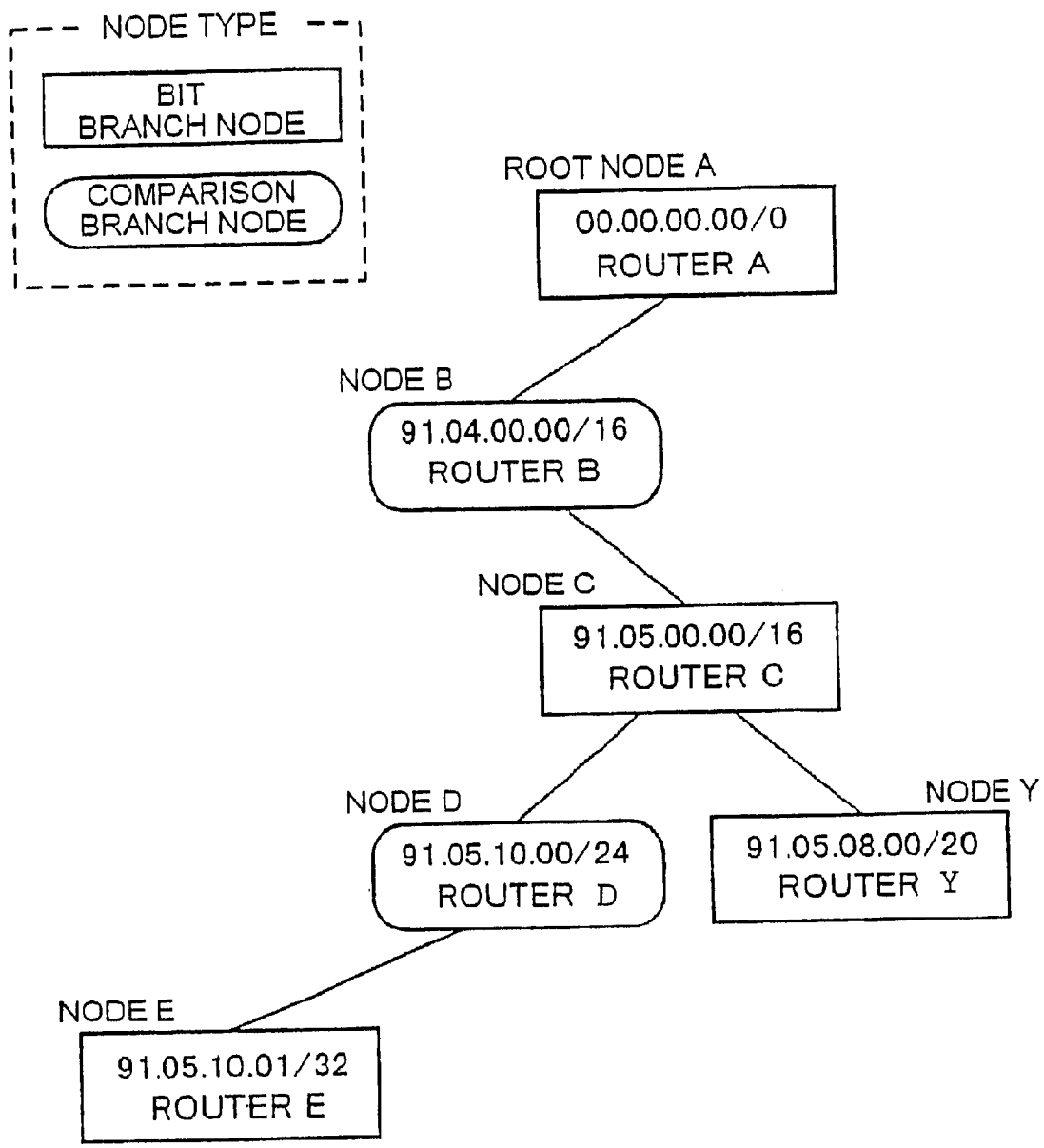
FIG. 3 is a view for describing a binary tree stored in a RAM illustrated in FIG. 2.

Referring to FIG. 3, description will be made of a specific example of the binary tree memorized in the RAM 15 illustrated in FIG. 2.

As illustrated in FIG. 3, the binary tree as an IP routing tree includes a root node A which is a bit branch node. The node A has an IP address and a mask represented by "00.00.00.00/0". In 32-bit representation, the IP address "00.00.00.00" of the node A is represented by "00000000000000000000000-00000000". The mask length "/0" is represented by "000000000000000000000-000000000000". Herein, a mask bit 0 and a mask bit 1 represent that each bit at a corresponding position is a "don't care" bit and an important bit, respectively.

The adopted route IP address is "ROUTER A".

Next, a node B at a left lower position is a left child node of the node A as a parent node A and is a comparison branch node. The node B has an IP address and a mask represented by "91.04.00.00/16". In 32-bit representation, the IP address "91.04.00.00" of the node B is represented by "010110110000-01000000000000000000". The mask length "/16" is represented by "1111111111111111000000000000000".

In this case, the parent node A is the bit branch node. A k-th bit (k being equal to the mask length plus one) of the child node B is a first bit (k=0+1=1) and has "0". Therefore, the node B is the left child node B.

The adopted route IP address is "ROUTER B".

Next, a node C at a right lower position is a child node of the node B as a parent node B and is a bit branch node. The node C has an IP address and a mask represented by "91.05.00.00/16". In 32-bit representation, the IP address "91.05.00.00" of the node C is represented by "0101101100000101-0000000000000000". The mask length "/16" is represented by "1111111111111111000000000000000".

In this case, the parent node B is the comparison branch node. A bit sequence of the IP address of the parent node B is different from a masked bit sequence obtained by masking the IP address of the child node C with the mask of the parent node B. Therefore, the node C is the right child node.

The adopted route IP address is "ROUTER C".

Next, a node D at a left lower position is a left child node of the node C as a parent node C and is a comparison branch node. The node D has an IP address and a mask represented by "91.05.10.00/24". In 32 bit representation, the IP address "91.05.10.00" of the node D is represented by "010110110000-01010000101000000000". The mask length "/24" is represented by "111111111111111111111111100000000".

In this case, the parent node C is the bit branch node. A k-th bit (k being equal to the mask length plus one) of the child node D is a 25th bit (k=24+1=25) and has "0". Therefore, this node is the left child node D.

The adopted route IP address is "ROUTER D".

Next, a node E at a left lower position is a left child node of the node D as a parent node D and is a bit branch node. The node E has an IP address and a mask represented by "91.05.10.01/32". In 32-bit representation, the IP address "91.05.10.01" of the node E is represented by "01011011 00000101-00001010 00000001". The mask length "/32" is represented by "11111111111111111111111111111111".

In this case, the parent node D is the comparison branch node. A bit sequence of the IP address of the parent node D is equal to a masked bit sequence obtained by masking the IP address of the child node E with the mask of the parent node D. Therefore, the node E is the left child node.

The adopted route IP address is "ROUTER E".

Next, a node Y at a right lower position is a right child node of the node C as a parent node C and is a bit branch node. The node Y has an IP address and a mask represented by "91.05.08.00/20". In 32-bit representation, the IP address "91.05.08.00" of the node Y is represented by "01011011 00000101-00001000 00000000". The mask length "/20" is represented by "11111111111111111111000000000000".

In this case, the parent node C is the bit branch node. A k-th bit (k being equal to the mask length plus one) of the child node D is a 21st bit (k=20+1=21) and has "1". Therefore, this node is the right child node Y.

The adopted route IP address is "ROUTER Y".

Figure 4:
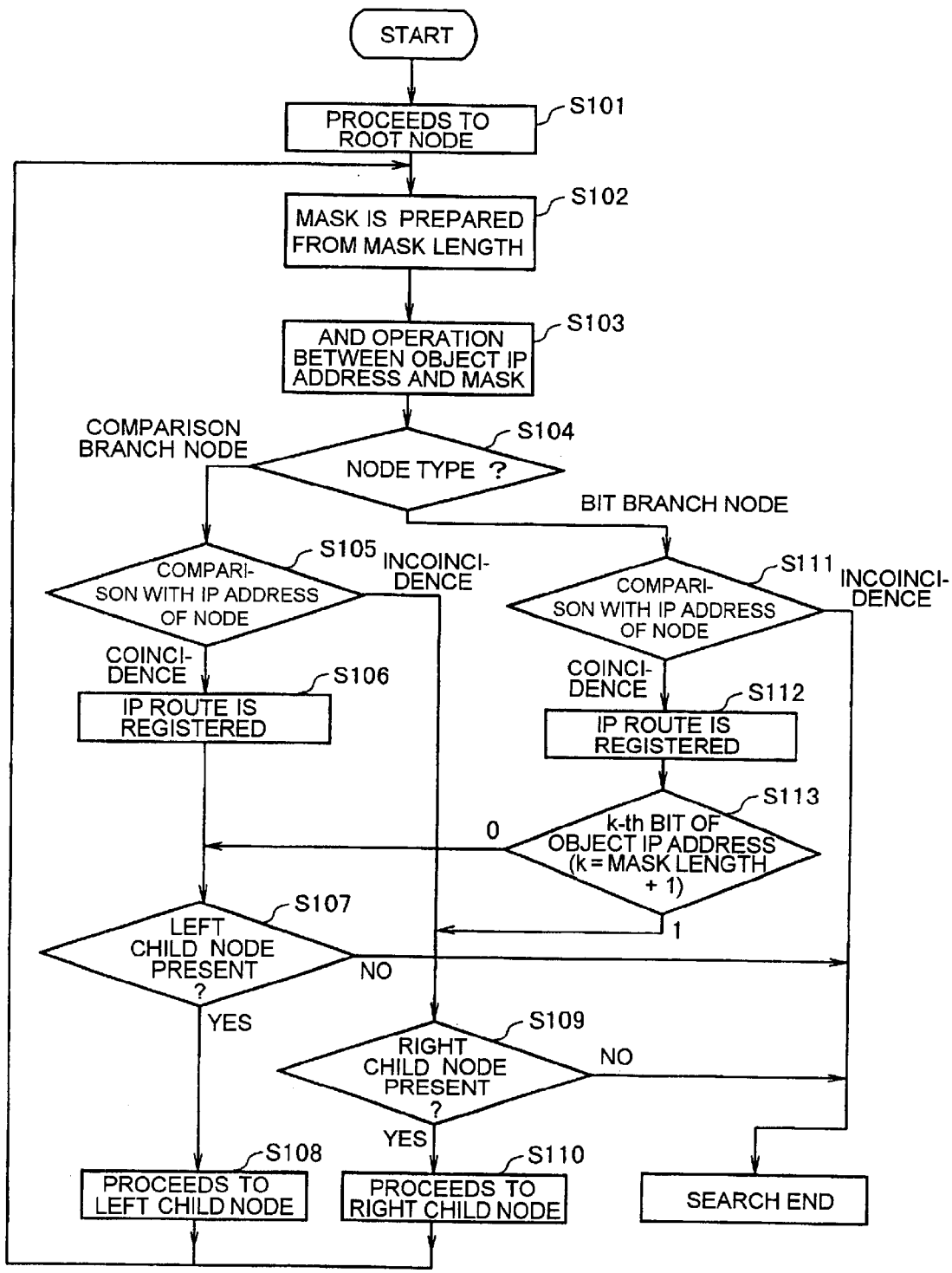
FIG. 4 is a flow chart for describing an operation of the high-speed IP routing system illustrated in FIG. 2.

Referring to FIG. 4, an operation of the high-speed IP routing system 1 will be described.

As illustrated in FIG. 4, routing or route look-up proceeds to the root node of the binary tree in a step S101.

In a step S102 following the step S101, the address comparison circuit 5 prepares a mask from the mask length of the node.

In a step S103 following the step S102, the address comparison circuit 5 produces the masked bit sequence calculated by an AND operation between the object IP address and the mask.

In a step S104 following the step S103, the next node selection circuit 2 judges whether the node type is the comparison branch node or the bit branch node.

If the node type is the comparison branch node, the operation proceeds to a step S105. In the step S105, comparison is made between the masked bit sequence produced by the address comparison circuit 5 through the steps S102 and S103 and the IP address of the node to judge coincidence or incoincidence.

If coincidence is detected in the step S105, the operation proceeds to a step S106 in which the adopted route determining circuit 4 holds the adopted route IP address.

In a step S107 following the step S106, judgment is made about whether or not the left child node is present. In absence of the left child node, the search comes to an end.

If presence of the left child node is judged in the step S107, the operation proceeds to a step S108 in which the routing proceeds to the left child node. Then, the operation returns to the step S102.

If the incoincidence is detected in the step S105, the step S105 is followed by a step S109 to judge whether or not the right child node is present. In absence of the right child node, the search comes to an end.

If presence of the right child node is judged in the step S109, the operation proceeds to a step S110. In the step S110, the routing proceeds to the right child node. Then, the operation returns to the step S102.

On the other hand, if the node type is judged as the bit branch node in the step S104, the operation proceeds to a step S111. In the step S111, comparison is made between the masked bit sequence obtained by the address comparison circuit 5 through the steps S102 and S103 and the IP address of the node to judge coincidence or incoincidence. If incoincidence is judged, the search comes to an end.

If the coincidence is judged in the step S111, the step S111 is followed by a step S112. In the step S112, the adopted route determining circuit 4 holds the adopted route IP address.

In a step S113 following the step S112, judgment is made about whether the k-th bit of the object IP address is "0" or "1" (k being equal to the mask length plus one). If "0" is judged, the step S113 is followed by the step S107. If "1" is judged, the step S113 is followed by the step S109.

Figure 5:
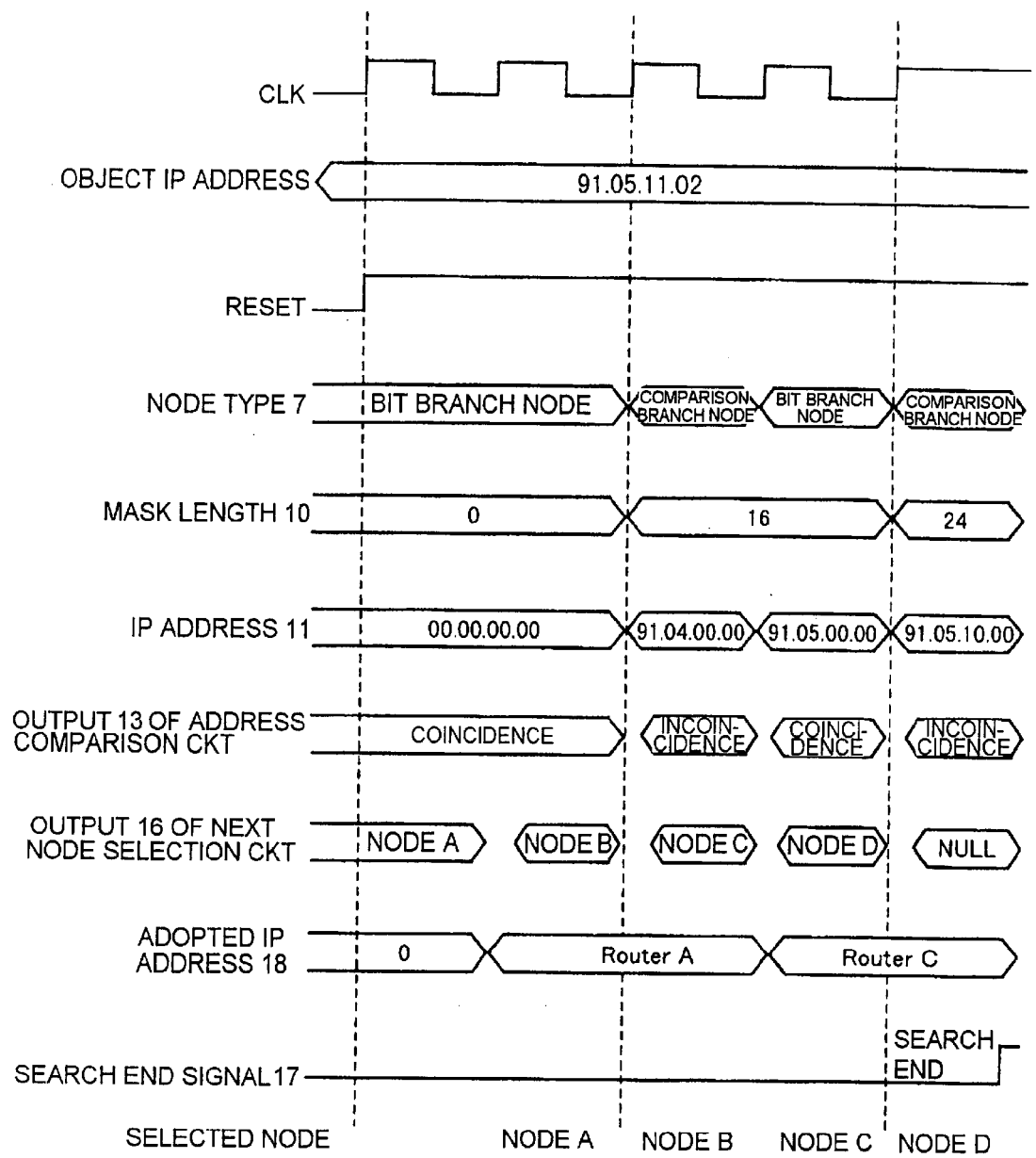
FIG. 5 is a timing chart for describing the operation of the high-speed IP routing system illustrated in FIG. 2.

Referring to FIG. 5, the operation in FIG. 4 will be described more in detail. It is assumed here that the object IP address "91.05.11.02" is subjected to routing by the use of the binary tree illustrated in FIG. 3.

In 32-bit representation, the object IP address "91.05.10.02" is represented by "01011011000001010000010110000010".

When the object IP address is supplied and a reset signal is turned from ON to OFF, the data held in the DFF 6 are all equal to "0".

Therefore, the next node number is "0" and the data of the root node A are outputted from the RAM 15. Herein, the node number of the root node must be "0". The data of the root node A are held by the DFF 6 at a leading edge of a clock pulse (step S101).

In the node A, the mask length is equal to 0. Therefore, the mask prepared is represented by "00000000000000000000000000000000" (step S102).

The masked bit sequence obtained by the AND operation between the mask and the object IP address is represented by "000000000000-00000000000000000000" (step S103).

The node A is the bit branch node (step S104).

The node A has the IP address "00.00.00.00" which is represented in 32-bit representation as "00000000000000000000000000000000".

Therefore, the masked bit sequence obtained by the AND operation is equal to the IP address. The address comparison circuit 5 produces the coincidence signal (step S111).

The adopted route determining circuit 4 holds the adopted route IP address "ROUTER A" and delivers the adopted IP address to the output line 18 (step S112).

The node A is the bit branch node. The k-th bit (k being equal to the mask length plus one) of the object IP address from the most significant bit is the first bit (k=0+1=1) and has "0" (step S113).

The next node selection circuit 2 produces the node number of the node B as the left child node (step S107).

As a consequence, the RAM 15 produces the data of the node B which are held in the DFF 6 at the leading edge of the clock pulse (step S108).

In the node B₁ the mask length is equal to 16. The mask prepared is represented by "11111111111111110000000000000000" (step S102).

The masked bit sequence obtained by the AND operation between the mask and the searched IP address "91.05.00.00"

is represented by "01011011000001010000000000000000" in 32-bit representation (step S103).

The node B is the comparison branch node (step S104).

The node B has the IP address "91.04.00.00" which is represented by "01011011000001000000000000000000" in 32-bit representation.

The masked bit sequence obtained by the AND operation is different from the IP address of the node B. The address comparison circuit 5 produces the incoincidence signal (step S105).

Since the address comparison circuit 5 produces the incoincidence signal, the next node selection circuit 2 produces the node number of the node C as the right child node (step S109).

As a consequence, the RAM 15 produces the data of the node C which are held in the DFF 6 at the leading edge of the clock pulse (step S110).

In the node C, the mask length is equal to 16. The mask is represented by "11111111111111110000000000000000" (step S102).

The masked bit sequence "91.05.00.00" obtained by the AND operation between the mask and the object IP address is represented by "01011011000001010000000000000000" (step S103).

The node C is the bit branch node (step S104).

The node C has the IP address "91.05.00.00" which is represented by "01011011000001010000000000000000" in 32-bit representation.

The masked bit sequence obtained by the AND operation is equal to the IP address of the node C. The address comparison circuit 5 produces the coincidence signal (step S111).

The adopted route determining circuit 4 holds the adopted route IP address "ROUTER C" and delivers the adopted route IP address to the output line 18 (step S112).

The node C is the bit branch node. The k-th bit (k being equal to the mask length plus one) of the object IP address is a 17th bit (k=16+1=17) and has "0" (step S113).

The next node selection circuit 2 produces the node number of the node D as the left child node (step S107).

As a consequence, the RAM 15 produces the data of the node D which are held in the DFF 6 at the leading edge of the clock pulse (step S108).

In the node D, the mask length is equal to 24. The mask prepared is represented by "11111111111111111111111100000000" (step S102).

The bit sequence "91.05.11.00" obtained by the AND operation between the mask and the object IP address is represented by "0101101100000101-0000101100000000" (step S103).

The node D is the comparison branch node (step S104).

The node D has the IP address "91.05.10.00" represented by "01011011000001010000101000000000" in 32-bit representation.

The masked bit sequence obtained by the AND operation is different from the IP address of the node D. Therefore, the address comparison circuit 5 produces the incoincidence signal (step S105).

The node D is the comparison branch node and the address comparison circuit 5 produces the incoincidence signal. Therefore, the next node selection circuit 2 selects the right child node. However, no right child node is present for the node D, the next node selection circuit 2 produces the NULL signal. Therefore, the search end judging circuit 3 produces the search end signal.

As described above, according to this invention, the number of nodes in the binary tree can be reduced to half at minimum as compared with the binary tree used in the conventional software-based IP routing technique. Therefore, it is possible to increase the number of route entries or to implement the system by the use of a small-capacity RAM. This is because the nodes forming the binary tree are classified into the "bit branch nodes" and the "comparison branch nodes".

Furthermore, IP routing can be carried out at a higher speed than in the software-based IP routing technique. This is because the number of nodes of the binary tree can be reduced to half at minimum as compared with the binary tree used in the conventional software-based IP routing technique and because the search algorithm is improved, taking into account the use of simultaneous processing of the next node selection and the address comparison, to remove useless transfer between the nodes which is inevitable in the Forward Search used in the conventional software-based IP routing technique.

What is claimed is:

1. A high-speed IP routing system for searching a best route for an object IP address by the use of a binary tree, said system comprising:

a volatile memory storing said binary tree comprising a plurality of route nodes each of which has route information, said route nodes comprising comparison branch nodes and bit branch nodes;

a next node selection circuit for successively selecting, with respect to said object IP address, every next one of the route nodes as selected nodes starting from a root node of said binary tree stored in said volatile memory;

an adopted route determining circuit for comparing said route information of each of said selected nodes and said object IP address to determine an adopted route IP address to be adopted as a next route;

wherein said route information comprises identification of a node type, an IP address of the node, a mask length, and an adopted route IP address;

said node type including the comparison branch node and the bit branch node;

each said comparison branch node and said bit branch node satisfying a condition that a parent node has a mask length not longer than that of a child node;

each said comparison branch node satisfying a condition that a bit sequence of said parent node is coincident with a masked bit sequence obtained by masking a bit sequence of one of left and right child nodes with a mask of said parent node; and each said bit branch node satisfying a condition that a bit sequence of said parent node is coincident with a masked bit sequence obtained by masking a bit sequence of one of left and right child nodes with the mask of said parent node and that a k-th bit from a most significant bit as a first bit has "0" and "1" in one and the other of said left and said right child nodes, respectively, where k is equal to the mask length plus one.

2. A high-speed IP routing system as claimed in claim 1, wherein:

if said selected node selected by said next node selection circuit is said comparison branch node, a first comparison is made between a masked result obtained by masking said object IP address with a mask of the mask length of said selected node and said IP address of said selected node to judge coincidence or incoincidence, said selected node being branched to one and the other of said left and said right child nodes upon coincidence and upon incoincidence, respectively, to continue searching or routing and wherein:

if said selected node selected by said next node selection circuit is said bit branch node, a second comparison is made between a masked result obtained by masking said object IP address with a mask of the mask length of said selected node and said IP address of said selected node, said selected node being branched, upon coincidence, to one and the other of said left and said right child nodes when a k-th bit has "0" and "1", respectively, where k is equal to the mask length plus one.

3. A high-speed IP routing system as claimed in claim 2, wherein said adopted route determining circuit produces, if coincidence is detected in the first or second comparison, said adopted route IP address of said selected node as a next route.

4. A high-speed IP routing system as claimed in claim 2, wherein, if said comparison branch node or said bit branch node does not have said left or said right child node to be a branch node upon selection by said next node selection circuit (2) or if incoincidence is detected in the second comparison for said bit branch node, searching or routing comes to an end.

5. A high-speed IP routing method of searching a best route for an object IP address by the use of a binary tree, said method comprising the steps of:

making a volatile memory store said binary tree comprising a plurality of route nodes each of which has route information, said route nodes comprising comparison branch nodes and bit branch nodes;

successively selecting, with respect to said object IP address, every next one of the route nodes as selected nodes starting from a root node of said binary tree stored in said volatile memory;

comparing said route information of each of said selected nodes selected in said selecting step and said object IP address to determine an adopted route IP address to be adopted as a next route, wherein said route information comprises identification of a node type, an IP address of the node, a mask length, and an adopted route IP address;

said node type including the comparison branch node and the bit branch node;

each said comparison branch node and said bit branch node satisfying a condition that a parent node has a mask length not longer than that of a child node;

each said comparison branch node satisfying a condition that a bit sequence of said parent node is coincident with a masked bit sequence obtained by masking a bit sequence of one of left and right child nodes with a mask of said parent node; and each said bit branch node satisfying a condition that a bit sequence of said parent node is coincident with a masked bit sequence obtained by masking a bit sequence of one of left and right child nodes with the mask of said parent node and that a k-th bit from a most significant bit as a first bit has "0" and "1" in one and the other of said left and said right child nodes, respectively, where k is equal to the mask length plus one.

* * * * *